2 Sheets--Sheet 1.
G. ERTEL.
Improvement in Compressing and Beater-Press.
No. 5,060. Reissued Sep. 17, 1872.
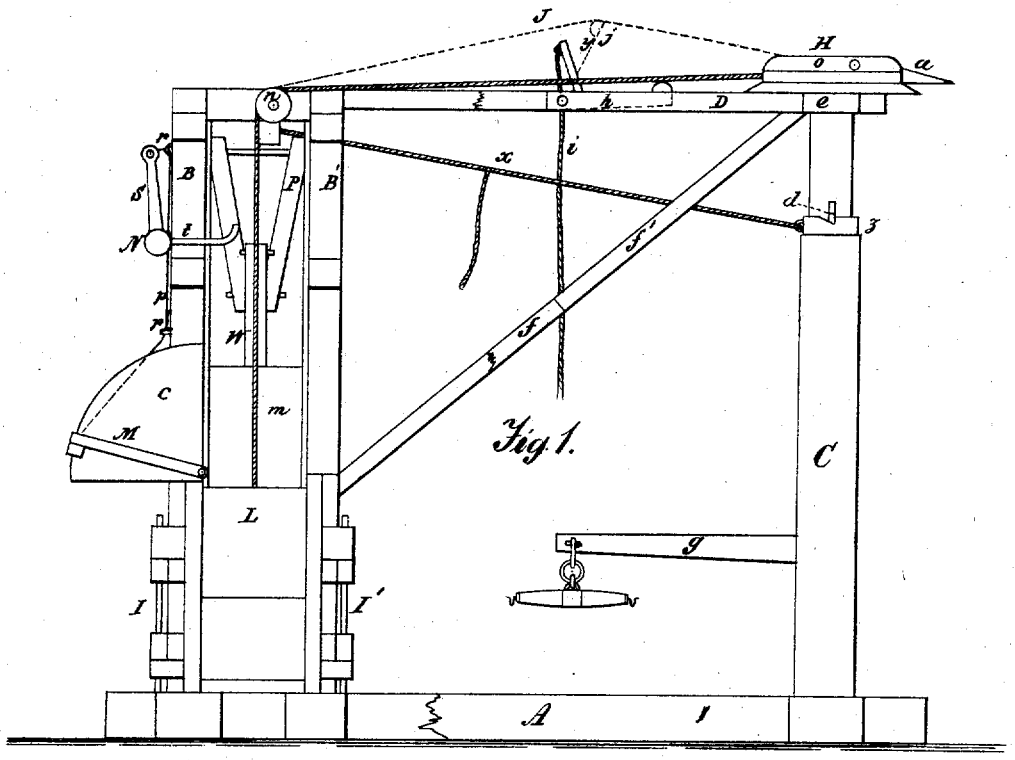
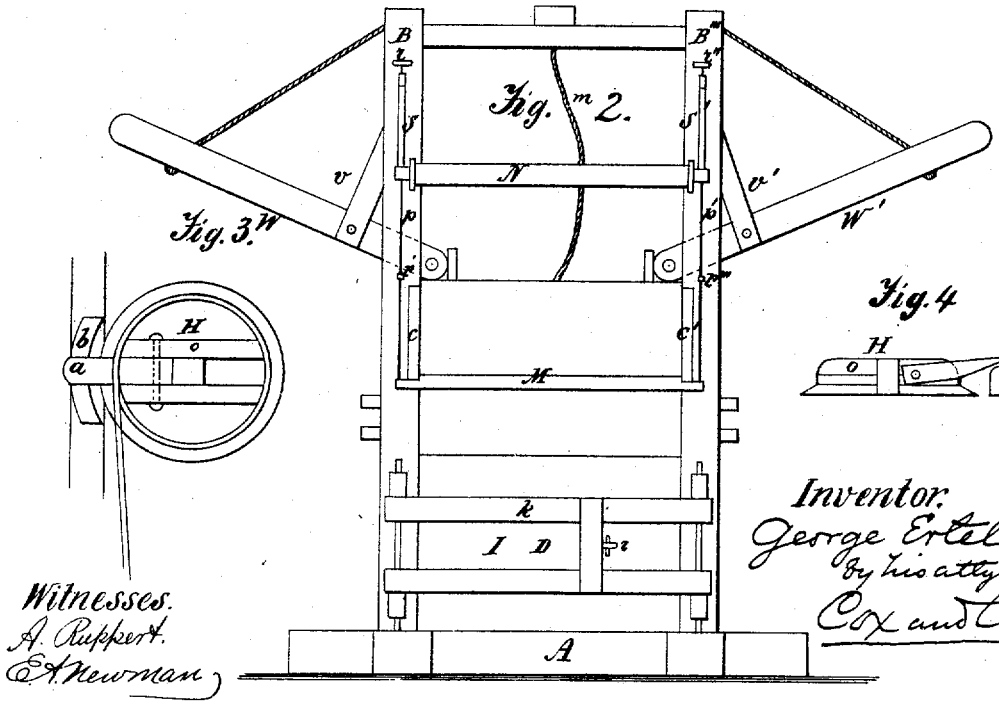
Witnesses.
A. Ruppert.
E. A. Newman
Inventor.
George Ertel
By his attys.
Cox and Cox
AM. PHOTO-LITHOGRAPHIC CO. N.Y. (OSBORNE'S PROCESS.)

2 Sheets--Sheet 2.

G. ERTEL.

Improvement in Compressing and Beater-Press.

No. 5,060. Reissued Sep. 17, 1872.

Witnesses.
E. F. Neuman
Chas. R. Abell

Inventor.
George Ertel
by his attys.
Cox and Cox

AM. PHOTO-LITHOGRAPHIC CO. N.Y. (OSBORNE'S PROCESS)

UNITED STATES PATENT OFFICE.

GEORGE ERTEL, OF QUINCY, ILLINOIS.

IMPROVEMENT IN COMPRESSING AND BEATER PRESSES.

Specification forming part of Letters Patent No. 76,063, dated March 31, 1868; reissue No. 5,060, dated September 17, 1872.

*To all whom it may concern:*

Be it known that I, GEORGE ERTEL, of Quincy, in the county of Adams and State of Illinois, late of Liberty, in said county and State, have invented a new and useful Improved Compressing and Beater Press, of which the following is a full, clear, and exact description, reference being had to the annexed drawing making a part of this specification, in which—

Figure 5:
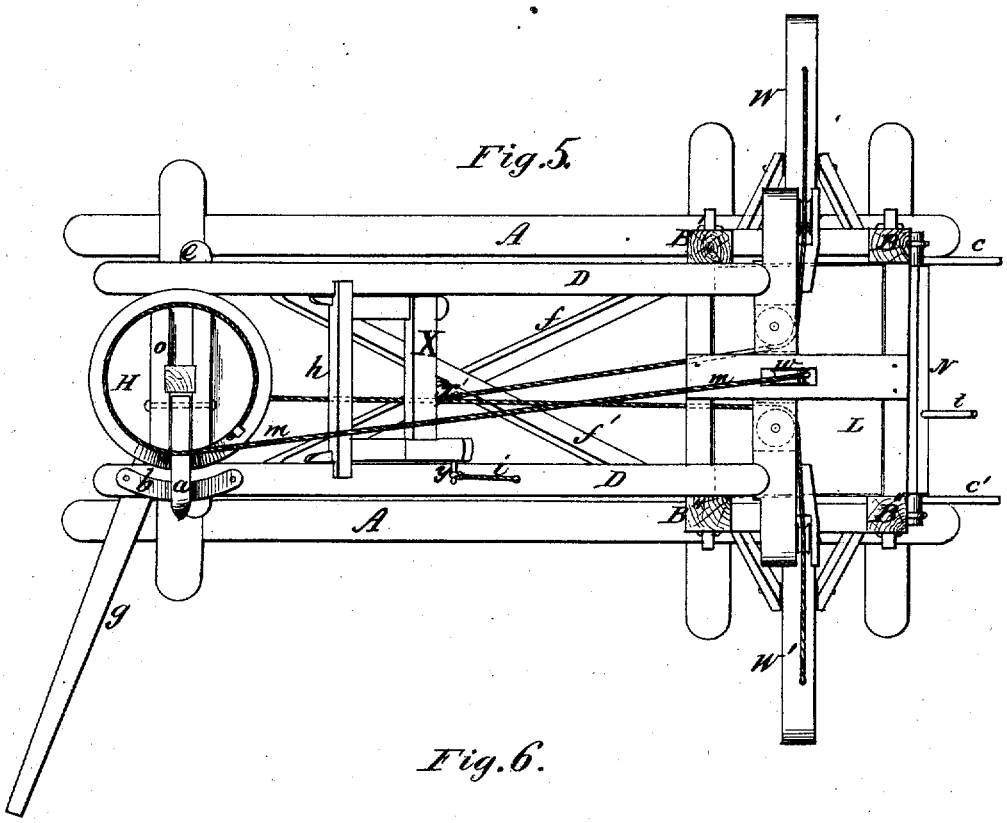
Figure 6:
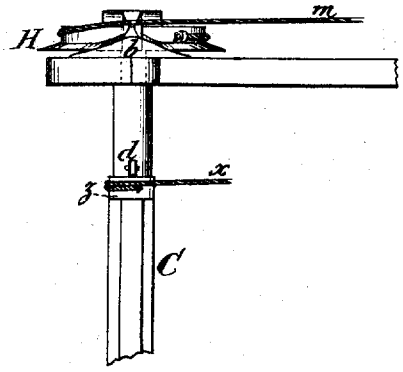

Figure 1 represents a side elevation of my invention. Fig. 2 represents front view of same. Fig. 3 represents a top view of the driving-wheel of my invention. Fig. 4 represents a sectional view of the same. Fig. 5 represents a top view of the invention. Fig. 6 is a side view, showing the construction of the cam *b*.

Similar letters indicate like parts.

The object of my invention is to rapidly and cheaply press hay and other substances by the combined action of the beating and compressing processes.

It consists of a frame, A, Figs. 1 and 2, at one extremity of which frame are fixed four columns, two of which, B B′, are seen in Figs. 5 and 1, and two, B B‴, in Fig. 2. These columns are strengthened and held firmly in position by numerous cross-pieces in the ordinary way. At the opposite end of the frame is placed a vertical driving-shaft, C, Fig. 1, having its upper bearing in the frame D, composed of two parallel bars connected at one extremity by a cross-piece, *e*, while the other extremities rest upon the columns B′ and B″. Two braces, *f f*, Fig. 1, extend diagonally from the extremities of the cross-piece *e* downward to the columns B B″. The motive power is applied to the arm *g*, attached to the driving-shaft C, while at the extremity of this shaft is rigidly secured a horizontal driving-wheel, H, Figs. 1, 3, and 4. The upper edge of this wheel is beveled, and across its upper surface is provided a double or slotted bar, *o*, Figs. 1, 3, and 4, having its extremities rounded or beveled down to the upper edge of the beveled part of the wheel, and in the slot is pivoted, at one end, so as to swing upward, a movable tongue, *a*, Figs. 1, 3, and 4. The lower outer part of the tongue projects beyond the lower beveled edge of the wheel H, and is properly inclined or curved upward and outward, so that when the wheel H revolves the tongue *a* shall come in contact with and be elevated by a fixed V-shaped cam, *b*, Figs. 3, 4, and 6, which is secured firmly on the cross-piece *e*, and is inclined or curved from its vertical center downward on each side. This cam *b* may be placed on any part of the machine, so that when the wheel H revolves the tongue *a* shall come in contact therewith. At the bottom of the columns there is a pit, having two gates opposite each other hung upon the tie-rods *q*, which connect the frame A with the pit-frame, passing through the extremities of certain braces in the latter and the sills of the former. One of these gates is seen at I, Figs. 1 and 2; the other at I′, Fig. 1—each being fastened, as seen in Fig. 2, by a frame, K, half as wide as the gate hung on the column opposite that supporting the gate. The upper and lower bars of these gates extend to the opposite side from that on which the gate is hung, and are reduced in width, so that when the frame K is closed, its upper and lower bars being correspondingly reduced, the fastening of the gate is equivalent to a bar of the same dimensions as the upper and lower gate-bars at their greatest width, the whole being arranged in such a way that when the gate is closed the frame may be pressed and held firmly against the gate by means of a hook, *l*, properly secured to the gate. A hammer-block, L, Figs. 1 and 2, works freely in the columns, which act as guides therefor, and is provided with the rope *m* passing over the pulley *n*, Fig. 1, and connected with the driving-wheel H. The under side of the hammer-block and the bottom of the pit are grooved to receive the rope or hoop required in baling. To the columns B B‴ is pivoted a platform, M, Figs. 1 and 2, working between two fixed rounded sides, *c c′*, Fig. 2, and *c*, Fig. 1, in such manner that when the platform is elevated any material upon its upper surface will be deposited in the pit, the platform being shown in Fig. 1 as slightly raised. To the ends of the platform M are attached ropes *p p′*, Fig. 2, and *p*, Fig. 1, which, passing through the rings *r r′ r″ r‴*, Fig. 2, and *r′*, Fig. 1, are fastened to the levers *s s*, Fig. 2, and *s*, Fig. 1, connected with the rock-shaft N, Figs. 1 and 2, which works freely in bearings in the columns B B‴. To N is attached a third lever, *t*, at right angles to the levers *s s′*. This lever is so arranged that when the hammer-block is being elevated its upper surface comes in contact with the lower surface of the lever *t*, rotates the rock-shaft N and levers *s s′*, thus drawing taut the ropes *p p′* and elevating the platform M, which, when not thus elevated, falls, by reason of its specific gravity, into a horizontal position. Two V-shaped yokes are pivoted to the upper extremities of the columns B B′ and B″ B‴, and swing freely between them. P, Fig. 1, shows a front view of one, while *v v′*, Fig. 2, shows one arm of each. To the apex of each yoke, near its extremity, is pivoted a lever, which, when not in use, hangs with its yoke between the columns, as seen at W, Fig. 1, while in Fig. 2 W W′ show the levers when in operation. Ropes attached to the ends of these levers, as seen in Figs. 2 and 5, pass over pulleys in the top cross-bars, connecting the columns B B′ and B″ B‴, and uniting at $x^1$, Fig. 1, or, extending, are fastened directly to the collar *z*, Fig. 1, working freely on the shaft C. This collar *z* has a single tooth or notch on it for the reception of the pawl *d*, pivoted in the driving-shaft C, and having a vertical movement. This collar may be provided with teeth or notches on both its upper and lower edges. The pawl *d* is placed above the collar *z*, so as to descend into the tooth or teeth thereon automatically. The ends of the levers W W′ will have a pivot fitting into a bearing in the upper edge of the hammer-block, or the block may be cast with ears, as seen in Fig. 2, for the ends of the levers to play against, according as the one mode or the other may be deemed preferable. A frame, X, the outlines of which are indicated by the dotted line *h*, Fig. 1, is pivoted to the frame D, and has an arm, *y*, attached to a cord, *i*, by which it may be adjusted.

The driving-shaft C being put in motion, as it rises the hammer-block lifts the lever *t*, slowly raising the platform M, already filled with hay; at the same time the driving-wheel H revolves and takes up the cord *m*, until the tongue *a* reaches the highest point on the cam *b*. The cord *m* is thus raised to the lower edges of the slotted bar *o*, over which it slips, and permits the hammer-block to fall upon the hay in the pit, while the platform M, by its own gravity, resumes its former position, ready to be again loaded and emptied. The rope *m* is so fastened, the cam *b* and tongue *a* so placed, that the rope *m* is thrown off the instant the hammer-block reaches its maximum elevation. The lever *t* and connections are so adjusted that the platform assumes a vertical position when the upper surface of the hammer-block, in ascending, passes the extremity of the lever *t*. The collar *z*, moving freely on the shaft, prevents the rope *x* being affected by these operations, and the frame *h*, over which the rope *m* passes, serves to take up the slack when the rope is thrown off. The shaft C, being in motion all the time, catches the rope *m*, and the same operation is repeated with great rapidity.

When no more hay can be forced into the pit by beating, the motion of the shaft C is reversed, and, the pawl *d* falling or being forced into a notch in the collar *z*, the rope *x* is wound around the shaft, drawing the rope taut, thus elevating the ends of the levers W W′ and bringing the opposite ends down upon the ears on the hammer-block, thus causing the yokes P to swing outward from between the columns until the descending ends of the levers W W′ rest upon the hammer-block, which rests upon the top of the hay, as shown at Fig. 2. This motion of the shaft being continued, any desired pressure is brought upon the hay, the pivot in the apex of each yoke serving as a fulcrum for its lever, and as the yokes swing on their pivots while the ends of the lever are being elevated, and the hammer-block is being forced down, the levers are all the time kept in position. Before the motion of the shaft is reversed the frame *h*, by means of the cord *i*, is brought into position indicated by the dotted line *j*, causing the rope *m* to take the direction of the dotted line J, which, preventing it being wound up by the wheel H, allows the hammer-block to rest upon the hay, uninfluenced by the action of the shaft when working the lever, the rope *m* hanging loose, as seen in Fig. 2.

What I claim as my invention, and desire to secure by Letters Patent, is—

1. The driving-wheel H, formed with a slotted bar, *o*, and movable tongue *a*, when constructed substantially as shown and specified.

2. The levers W W′, the yokes P P′, the rope *x*, the collar *z*, and pawl *d*, all in combination, when constructed and arranged substantially as shown and specified.

3. The driving-wheel H, the levers W W′, the platform M, the rock-shaft N, the levers *s s′* and *t*, pawl *d*, collar *z*, of a compressing and beater press, all constructed and arranged in relation to one another, and to the other parts of the machine, substantially as and for the purpose specified.

4. The levers W W′, in combination with the yokes P, when used in the manner, and for the uses and purposes, substantially as shown and described.

5. The movable notched collar *z*, for the uses and purposes shown and described.

6. The combination of the collar *z*, pawl *d*, and presser-rope *x*, substantially as shown and described.

7. The driving-wheel H, provided with the slotted bar *o* and movable tongue *a*, in combination with the cam *b* and beater-ropes *m*, substantially as shown and described.

8. The cam *b*, for the purpose of tripping the tongue *a*, substantially as shown and described.

9. The rope *m*, cam *b*, tongue *a*, arranged as shown, so that the rope *m* is thrown off the instant the hammer-block reaches its maximum elevation, substantially as shown and described.

10. The rock-shaft N, levers *s s'*, cords *p p'*, platform M, in combination with the hammer-block L, substantially as shown and described.

11. The tie-rods *q*, arranged and constructed substantially as shown and described.

GEO. ERTEL.

Witnesses:
HARRY COX,
H. H. HOFFMAN.